United States Patent
Kuwano

[11] Patent Number: 5,995,311
[45] Date of Patent: Nov. 30, 1999

[54] HEAD SWITCH SEQUENCE TO PROTECT MAGNETO-RESISTIVE (MR) HEAD

[75] Inventor: Hiro Kuwano, Plano, Tex.

[73] Assignee: Texas Instruments Incorporated, Dallas, Tex.

[21] Appl. No.: 08/846,919

[22] Filed: Apr. 30, 1997

Related U.S. Application Data

[60] Provisional application No. 60/016,549, Apr. 30, 1996.

[51] Int. Cl.[6] ................................................. G11B 15/12
[52] U.S. Cl. ................................ 360/61; 360/63; 360/64; 360/66
[58] Field of Search .................................. 360/66, 46, 67, 360/61, 62, 63, 64

[56] References Cited

U.S. PATENT DOCUMENTS

| | | | |
|---|---|---|---|
| 4,833,559 | 5/1989 | Belk | 360/61 X |
| 4,879,610 | 11/1989 | Jove | 360/67 |
| 5,373,402 | 12/1994 | Price | 360/61 |
| 5,426,542 | 6/1995 | Smith | 360/67 |

*Primary Examiner*—Alan Faber
*Attorney, Agent, or Firm*—W. Daniel Swayze, Jr.; Wade James Brady, III; Richard L. Donaldson

[57] ABSTRACT

A switch device switchable as a first channel (200) to an inactive state and a dummy channel (201) to an active state the switching device switches the dummy channel to an inactive state while switching a second channel 300 to an active state.

10 Claims, 2 Drawing Sheets

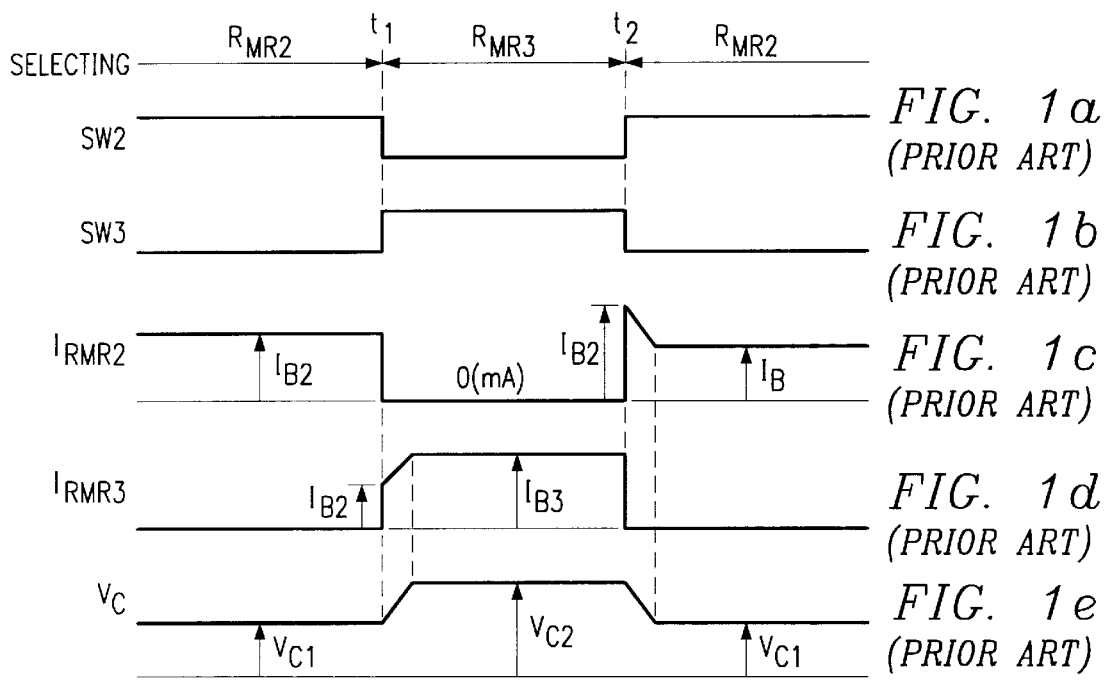
FIG. 1a (PRIOR ART)
FIG. 1b (PRIOR ART)
FIG. 1c (PRIOR ART)
FIG. 1d (PRIOR ART)
FIG. 1e (PRIOR ART)
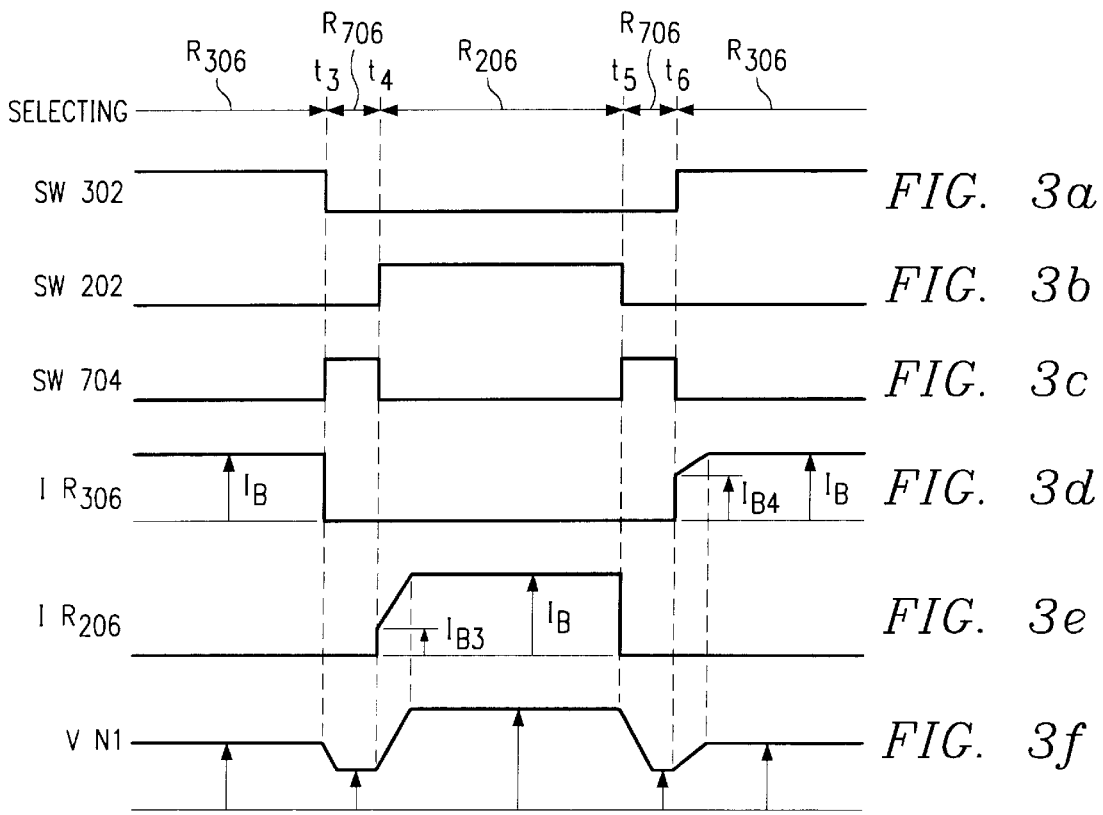
FIG. 3a
FIG. 3b
FIG. 3c
FIG. 3d
FIG. 3e
FIG. 3f

HEAD SWITCH SEQUENCE TO PROTECT MAGNETO-RESISTIVE (MR) HEAD

This application claims priority under 35 USC §119(e)(1) provisional application Ser. No. 60/016,549 filed Apr. 30, 1996.

TECHNICAL FIELD OF THE INVENTION

The present invention relates to devices for switching channels, and more particularly to devices for switching channels used in MR systems having at least one magnetic disk.

BACKGROUND OF THE INVENTION

Magnetic disc drives have read/write heads which are used for both writing data to a magnetic disc and reading data from the magnetic disc. During a write operation, a write signal is provided to a selected read/write head from a write control circuit. The write signal represents data to be encoded into the magnetic disc. More particularly, the read/write head receives encoded digital data from a "channel" chip. The transitions of the signal received from the channel chip cause the write current flowing within the write/read head to reverse direction which in turn, induces a flux reversal in the magnetized material of the medium.

During a read operation, the read/write head senses flux reversals from the magnetic disc. The flux reversals are encoded into the magnetic disc during the write operation. Based on the flux reversals, the read/write head provides a read signal to a read channel. The read circuit amplifies the read signal, and the channel circuit recovers the data. The read circuit then provides the data to a magnetic disc controller for further processing.

Each magnetic disc in a disk drive has a corresponding "head" adjacent to the top and bottom surface of the disc. Thus, there are two N heads per stack where N equals the number of disks in a drive. Normally, only one head is active at a given time in order to control these channels.

Each channel additionally includes a current path for current to flow to the MR head. In this current path is an input transistor to control the flow of the current in the current path, the input transistor is controlled by connecting the base of the transistor to a switch which can be selectively activated. Since each of the channels have one of these input transistors, when one channel is desired to be inactivated, the switch disconnects the base of the input transistor of that channel while another channel is activated by connecting the base of input transistor of this other channel to a voltage, allowing the current to flow the activated current path. The bases of these input transistors are usually connected to a common bias line which is coupled to a capacitor to stabilize and noise filter the voltage in the line. However, this capacitor can introduce problems. Typically, the resistance of the individual magnetic head varies from channel to channel. However, the bias current in the current path of the channel is generally constant, resulting in differing voltages across the magnetic head. If there is a large resistance with a constant current a large voltage results. A small resistance with the same constant current results in a small voltage. These voltages are on the capacitor. As the channels are switched, the voltage on the capacitor can adversely affect the current through the magnetic lead switching from a channel with a high resistance to a channel with a low resistance causing excess current to flow in the channel which has been activated.

FIGS. 1a–1e illustrates the problem resulting from the switching between channels of differing resistance. Presuming that switching has occurred between the second and third channels at $t_1$, the current $I_{B2}$ through the current path of the second channel is reduced to zero while as illustrated in FIG. 1d, the current $I_{B3}$ at $t_1$ is the current flowing through the third channel based on the resistance $R_{MR3}$ of the third channel. Correspondingly, as illustrated in FIG. 1e, the voltage across $V_c$ increases at t=1 to a $V_{c2}$ which is larger than $V_{c1}$ as a result of the higher resistance $R_3$. However, a problem develops as illustrated in FIG. 1c at $t_2$ when the MR system switches from a channel having high resistance such as the third channel to a channel having low resistance such as the second channel. Because of the high voltage $V_{c2}$ the current is determined by the instant amendment the claims have been amended to obviate the rejection relations of the voltage to the head resistance. Thus, a high voltage results in, as illustrated in FIG. 1c, a high current beginning at time $t_2$ and ending at a time subsequent to $t_2$ when the voltage reaches the $C_1$. This high current for the interval time after $t_2$ results in damage to the head associated with the second channel. Thus, there is a need to eliminate the high transient current resulting from switching between channels, particularly when there is a switch from a channel having a relatively high impedance to a channel having a relatively low impedance.

SUMMARY OF THE INVENTION

The present invention, eliminates high transient currents in the MR channel by avoiding directly switching between two MR channels that are actively connected to heads. More particular, the present invention switches to a dummy channel that is not connected to a head when switching between active channels. When switching between active channels, the present invention switches from an active channel to a dummy channel and then from the dummy channel to the next active. Thus, a period of time is provided for while the system is switched to the dummy channel the voltage of the capacitor to adjust to a change in resistance. Since there is no current in the channel, the excess current can be safely drained through the dummy channel, avoiding damage to the active head.

BRIEF DESCRIPTION OF THE DRAWINGS

FIGS. 1a–1e illustrates a timing chart of a prior art circuit;

FIGS. 3a–3f illustrates a timing chart of the present invention.

DETAILED DESCRIPTION OF THE INVENTION

Figure 2:
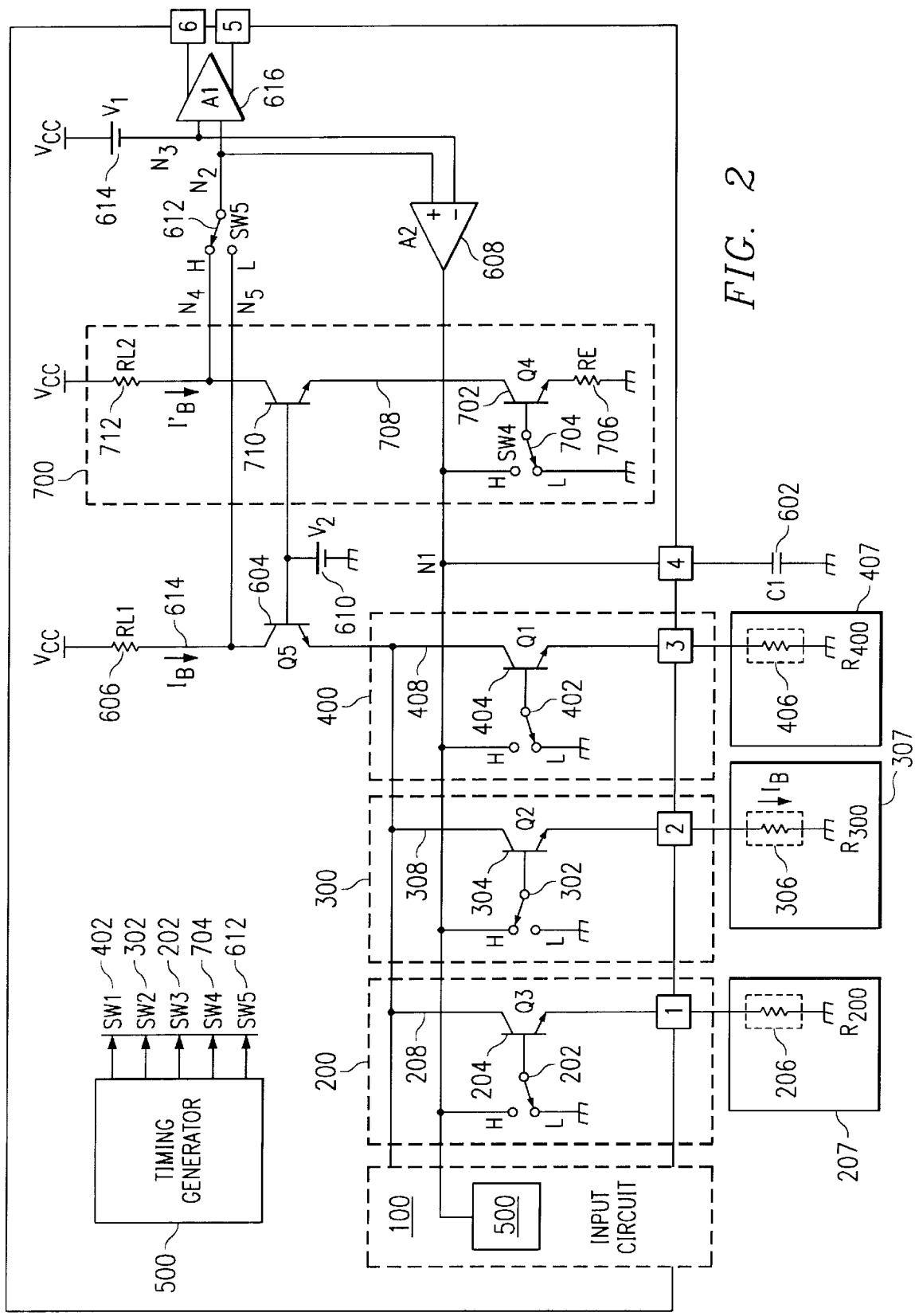
FIG. 2 illustrates a circuit of the present invention.

FIG. 2 illustrates an input circuit 100 to output active control signals to control active channels 200, 300 and 400, respectively which are coupled to active heads 207, 307 and 407 which are expected to change the magnetic flux on a magnetic disk. Although, 3 active channels are illustrated in FIG. 2, additional channels could be implemented in accordance with the teachings of the present invention. Each of the active and dummy channels include a control device to control the current path to the channel. Using MR channel 200 as an illustration, the current path conducts current, for example a bias current $I_B$ from $V_{cc}$, through the resistance LOAD 606, the input transistor 204 for example a transistor and through the MR resistance 206. The input transistor 204 is controlled by switch 202 which is connected to the base of the input transistor 204. The timing generator circuit 500 outputs active control signals to selectively control the switches 202, 302 and 404, respectively and dummy control signal to selectively control switch 704. When selected, the switches are activated or deactivated respectively. Additionally, the timing generator 500 controls the switch 612 and the switch. Additionally, a dummy channel 706 is coupled to amplifier 608 and activity channels 200, 300 and 400 to be activated between switching of the active channels 200, 300 and 400. The dummy channel 700 includes a current path 708 and a dummy input transistor 702 to control the current path. A switch 704 is connected to the control device 702, which is control by the timing generator 500. The timing generator 500 outputs signals to switch 704 to selectively activate and deactivate this switch which in turn controls the dummy input transistor 702 though the base of the dummy input transistor 702. A differential amplifier 608 is coupled to channels 200, 300, 400 and 700, switch 612 and voltage source 614 as a feedback to control the voltage at node $N_1$ during the operation of the MR system. The voltage to current amplifier 608 is controlled by a voltage source 614. Additionally, the feedback circuit of the amplifier 608 is control by switch 612; the switch 612 is switched to terminal $N_4$ as the switch 704 is activated to provide a first feedback circuit for the dummy channel 700. Likewise, a second feedback circuit is provided by switch 612 connected to terminal $N_5$ to provide a second feedback circuit for the selected channels 200, 300 or 400. While the active channels 200, 300 and 400 are selected by the timing generator 500 through switches 202, 302 and 402, respectively. The amplifier 608 is connected at node $N_2$ through switch 612 to node $N_5$ which measures the voltage across the resistive load 606. Since the voltage across 606 is proportional to the current $I_B$ the voltage rises at $N_2$ as a result of increasing current $I_B$. A difference is sensed by amplifier 608; this difference is amplified and output to node $N_1$ which in turn reduces the current $I_B$. Thus, the amplifier 608 acts as a feedback loop to maintain the voltage at $N_2$. In a similar fashion, the amplifier 608 maintains the voltage at $N_1$ while the dummy channel is activated since switch 612 is connected to node $N_4$ measuring the voltage across the resistance load 712.

The voltage source 610 is connected to the base of transistors 604 and 710, respectively to provide a cascoded transistor for transistors 204, 304 and 404 and dummy transistor 704 to be maintained in the triode state.

The timing generator 500 activates one of the active channels 200, 300 or 400 by selectively activating either the switch 202, 203 or 402. Thus, switch 612 switches the amplifier 608 to provide the feedback from either the current path 708 or current 614. Additionally, the output of amplifier 616 amplifies the voltage from either transistor 604 or transistor 710 in accordance with whether the dummy channel or one of the active channels is switched in or switch out.

In operation the timing generator 500 selects either the active channels 200, 300 or 400 or the dummy channel 700 by activating either the switches corresponding to channels 200, 300 and 400 namely, switch 202, switch 302 and switch 402 or if the dummy channel is selected the switch 704. The timing generator 500 does not directly switch between two active channels, for example, 200 and 300 but switches to the dummy channel 700 between switching the active channels. Such an operation is illustrated in FIGS. 3a–3f. As illustrated in FIG. 3a, switch 302 had been selected prior to $t_3$. At $t_3$, switch 302 is inactive and switch 704 is activated. Switch 612 is activated to connect node $N_4$ so that the feedback amplifier 608 feeds back the proper channel.

As illustrated in FIG. 3f, active channel 300 is activated after $t_3$ the voltage is reduced across the capacitor $C_1$. At $t_4$, the dummy channel is inactivated, and the channel 200 is activated. After time $t_4$, the current bias current $I_B$ increases, and the voltage V additionally increases until an equilibrium is achieved with the channel 200 being active. At $t_5$, the channel 200 is inactivated, and again the dummy channel is activated by activating switch 704 to connect current path 708. The current $I_B$ is reduced to zero since this current path is no longer complete. Additionally, after the time $t_5$, the voltage across $N_1$ reduces. At $t_6$, the dummy channel is switched off and an active channel is activated for example channel 300. Since the voltage at node $N_1$ has been reduced the current is not large at $t_6$ and the current increases until $I_B$ bias is reached. Thus, the disadvantages of the prior art are overcome.

EQUATION 1. The voltage across the resistance of the heads is illustrated by:

$$\nabla_{MR} = R_{MR} \times I_B$$

where $\nabla_{MR}$ = voltage across $R_{MR}$

EQUATION 2. The voltage at $N_1$ is the voltage across the resistance plus the $$\nabla_{C1} = \nabla_{MR} + \nabla_{BE} = R_{MR} \times I_B + \nabla_{BE} \text{ (Selecting an actual head)}$$

where $V_{C1}$ = voltage across $C_1$ $$= R_E \times I'_B + \nabla_{BE} \text{ (Selecting an dummy head)}$$

Where assuming all $T\nabla_{BE}s$ are the same value.

$$n = \frac{RL2}{RL1} = \frac{I_B}{I'_B}$$

$$= \frac{\text{Area of Emitter}(202, 302, 402)}{\text{Area of Emitter}(702)}$$

EQUATION 3.

Transient Current $I_{B1} = (\nabla_{C11} - \nabla_{BE})/R_{MR3}$ $$= I_B \times \frac{R_{MR3}}{R_{MR2}}$$

where $\nabla_{C11} = R_{MR2} \times I_B + \nabla_{BE}$

EQUATION 4.

Transient Current $I_{B2} = (\nabla_{C12} - \nabla_{BE})/R_{MR2}$ $$= I_B \times \frac{R_{MR3}}{R_{MR2}}$$

where $\nabla_{C12} = R_{MR3} \times I_B + \nabla_{BE}$ thus, the maximum current is:

EQUATION 5.

$$I_B(\max) > \frac{\nabla_C - \nabla_{BE}}{R_{MR(\min)}} = \frac{RE/N}{R_{MR(\min)}} \times I_B$$

$$R_E < n \times R_{MR(\min)} \times \frac{I_B(\max)}{I_B}$$

where $R_E$ dummy head resistance what is claimed:
1. An apparatus for switching between active channels to access a storage device, comprising:
   a first channel to a first head being switchable between a first active state and a first inactive state;
   a second channel to a second head being switchable between a second active state and a second inactive state;
   a dummy channel to a dummy load without a head being switchable between a third active state and a third inactive state; and a switch to switch said first channel from said first active state to said first inactive state and to switch said dummy channel to said third active state while said first channel is in said first inactive state and said second channel is in said second inactive.

2. An apparatus for switching between active channels to access a storage device, as in claim 1, wherein said switch switches said dummy channel to a third inactive state and switch said second channel to said second active state while said first channel is in said first inactive state.

3. An apparatus for switching between active channels to access a storage device, as in claim 2, wherein said first and second channel is a first current path.

4. An apparatus for switching between active channels to access a storage device, as in claim 3, wherein said dummy channel is in a second current path.

5. An apparatus for switching between active channels to access a storage device, as in claim 1, wherein said switch switches to a first feedback path to maintain a voltage applied to said first and second channel.

6. An apparatus for switching between active channels to access a storage device, as in claim 5, wherein said switch switches to a second feedback path to maintain a voltage applied to said dummy channel.

7. A method for switching between active channels to access a storage device, comprising the steps of:

switching a first channel to a first head between a first active state and a first inactive state;

switching a second channel to a second head between a second active state and a second inactive state; and switching a dummy channel to a dummy load without a head while said first channel is in said first inactive state and while said second channel is in said second inactive state.

8. A method for switching between active channels to access a storage device, as in claim 7, wherein said method includes the step of switching said dummy channel to said inactive state while said first channel is in said first inactive state and switches said second head to said active state.

9. A method for switching between active channels to access a storage device, as in claim 7, wherein said method includes the step of switching a feedback loop to maintain a voltage applied to said first and second channels.

10. A method for switching between active channels to access a storage device, as in claim 9, wherein said method includes the step of switching a feedback loop to maintain a second voltage applied to said dummy channel.

* * * * *